Figure 10:
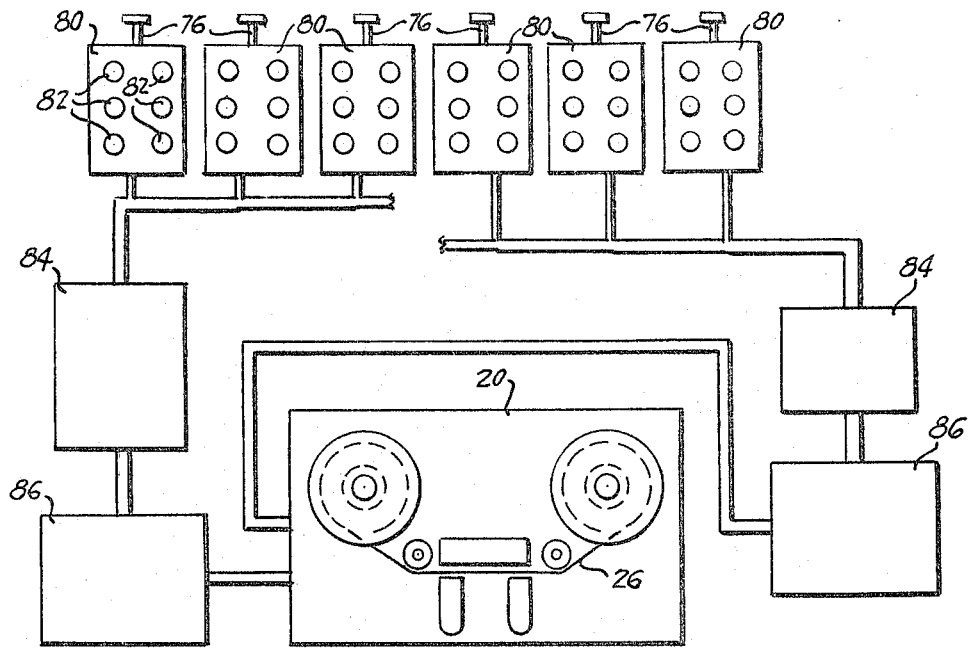

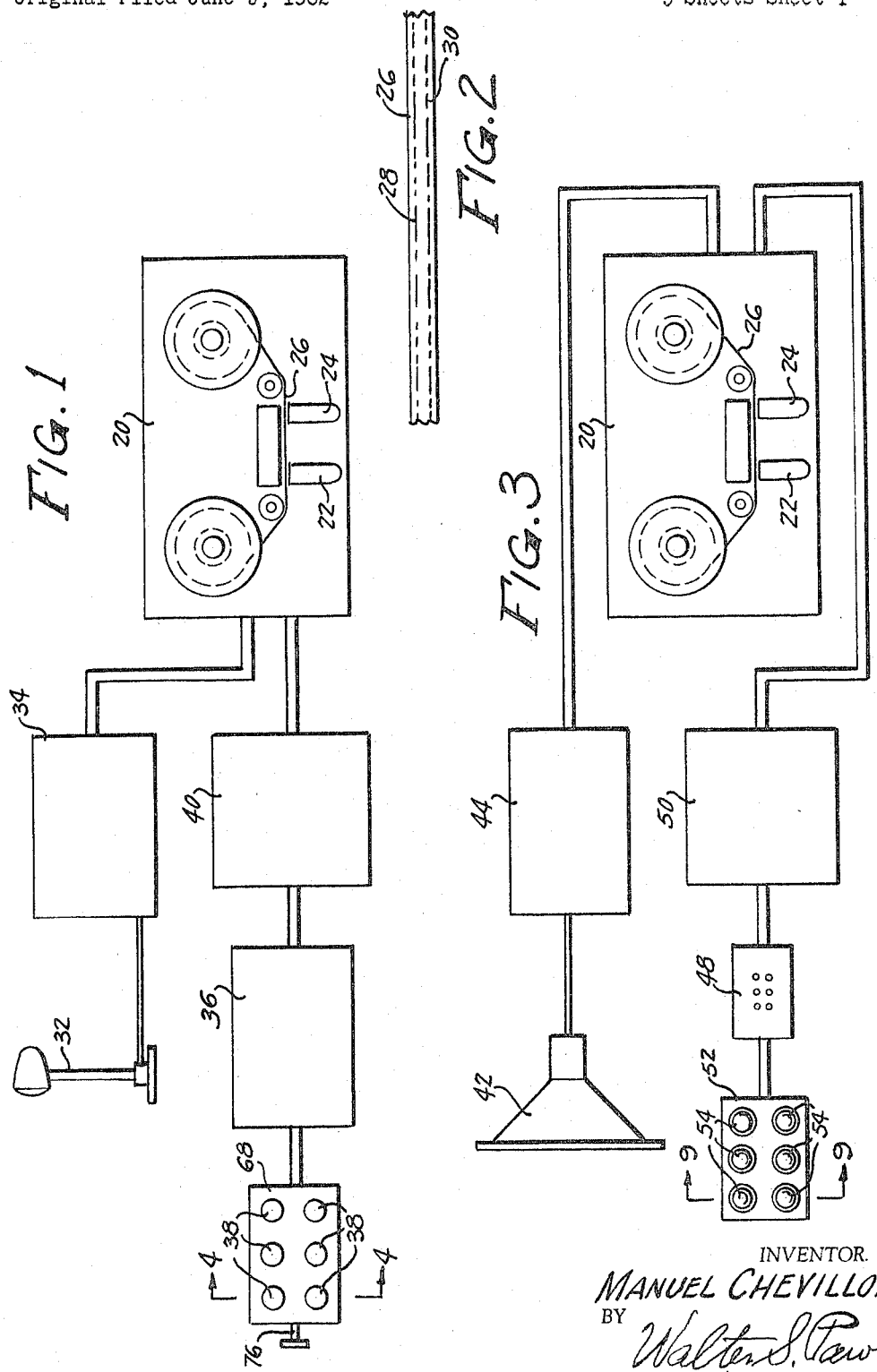

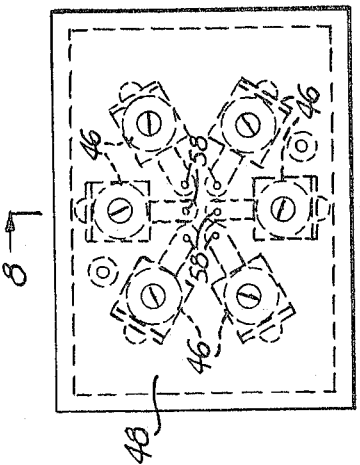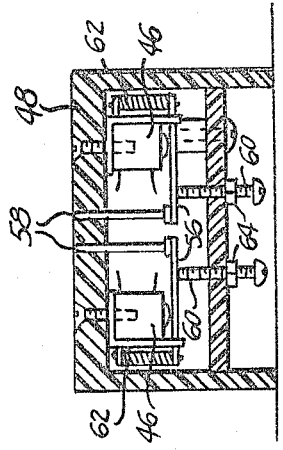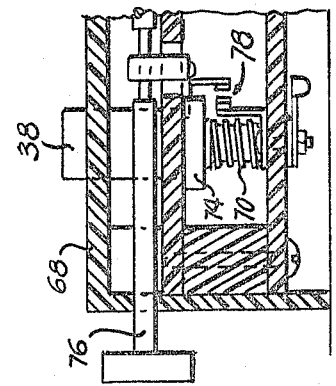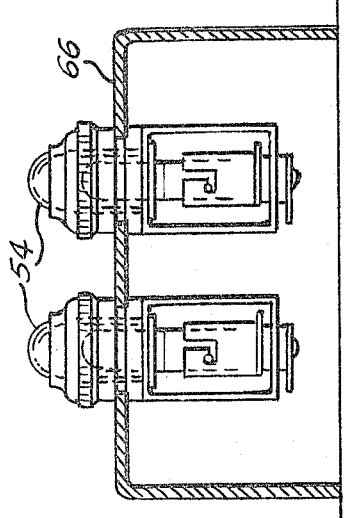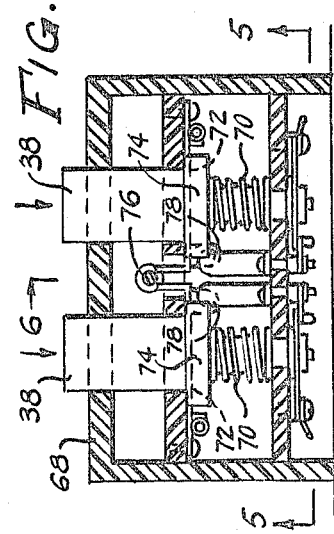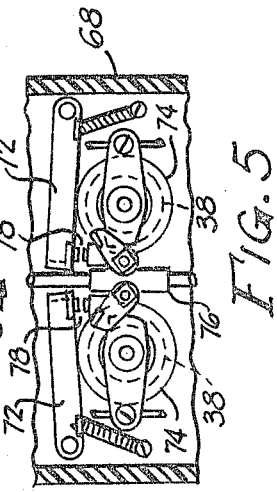

INVENTOR.
MANUEL CHEVILLON
BY
ATTORNEY.

United States Patent Office 3,289,327
Patented Dec. 6, 1966

3,289,327
BRAILLE RECORDING AND REPRODUCING MEANS
Manuel Chevillon, Montgomery County, Md.
(14506 Fairacres Road, Silver Spring, Md.)
Continuation of application Ser. No. 200,124, June 5, 1962. This application Mar. 10, 1966, Ser. No. 536,561
4 Claims. (Cl. 35—35)

This is a continuation of application Serial No. 200,124, filed June 5, 1962, now abandoned.

The present invention relates to a system of teaching braille reading, and to a means for making a double track recording which may consist of a sound track and an instrument operating control track for reproducing braille letters on a fingerboard when the recording is played back, along with the reproduction of the instructor's voice describing the braille letters which are simultaneously reproduced on the fingerboard, or both tracks may be used for instrument operation.

The main object is to provide in a system for recording of a voice or sound track and control signals on an instrument control track simultaneously, a keyboard for recording control signals for the operation of a fingerboard and the instructor's voice describing said operation, and for reproducing braille letters on said fingerboard in accordance with said control signals while simultaneously reproducing the instructor's voice.

A further object is to provide a control keyboard for recording signals which are adapted to reproduce any letter, number or punctuation in braille.

A further object is to construct a keyboard having six keys representing the six bumps of a braille bump pattern, each key operating a tuned oscillator for producing a signal of corresponding frequency in accordance with the position of the bump it represents in the braille pattern, and a voice recorder having means for simultaneously recording the signals produced by the operation of the keyboard.

A further object is to construct a panel having a plurality of keyboards, each keyboard having six keys representing the six bumps of a braille bump pattern, each key in any of the keyboards operating a differently tuned oscillator for producing a signal of corresponding frequency in accordance with the specific location of the individual bump which it represents on a panel, said panel having a line of braille letter spaces of actual size, each space comprising a fingerboard, each bump on any of the fingerboards being operated by a specific solenoid in response to a signal of corresponding frequency.

A further object is to use a double track recorder and play-back device in the above construction, and to connect a portion of the keyboards to produce one track, the remainder thereof being connected to produce the other track, and to operate each of the bumps in the line of letter spaces in response to the frequency corresponding to the key in the same relative position on the keyboard panel.

Figure 11:
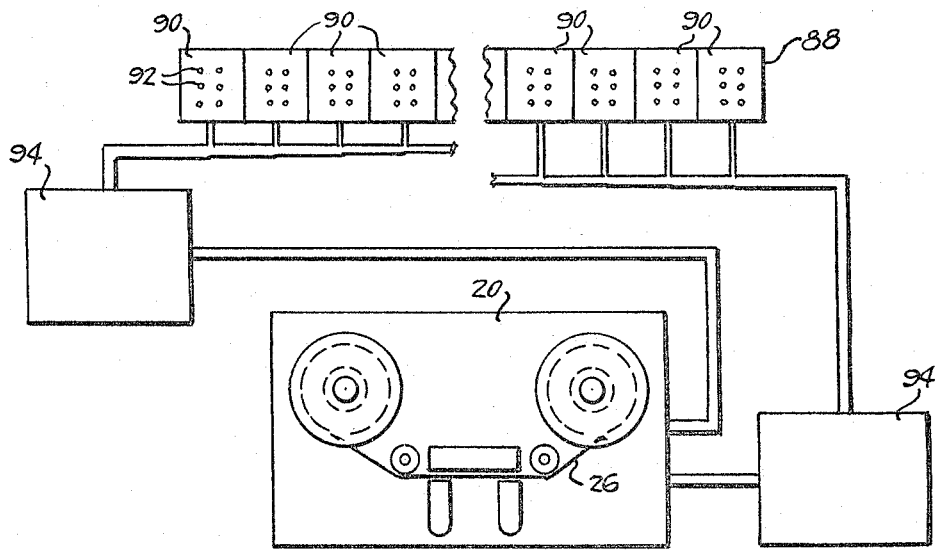

Other and more specific objects of the present invention will appear in the following detailed description of the apparatus and method used, as illustrated in the accompanying drawings wherein:

FIGURE 1 is a diagrammatic view of the recording apparatus,

FIGURE 2 is a view of the recorded tape showing the simultaneously recorded and played back sound and control signal tracks, FIGURE 3 is a diagrammatic view of the play-back and monitoring apparatus, FIGURE 4 is a sectional detailed view of the keyboard mechanism taken on the line 4—4 of FIGURE 1, FIGURE 5 is a sectional view of the keyboard box taken on the line 5—5 of FIGURE 4, FIGURE 6 is a sectional view taken on the line 6—6 of FIGURE 4, FIGURE 7 is a plan view of the fingerboard for producing the bumps of a braille character on its surface, FIGURE 8 is a sectional view of the fingerboard box taken on the line 8—8 of FIGURE 7, FIGURE 9 is a sectional view of the visual monitor taken on the line 9—9 of FIGURE 3, FIGURE 10 is a diagrammatic view of the recording set-up using a plurality of keyboards, and FIGURE 11 is a similar view of the play-back set-up using a plurality of fingerboards aligned in accordance with actual braille.

The apparatus used in the present system of teaching braille by means of vocal instructions and simultaneous automatic operation of a fingerboard for physically reproducing the bumps representing any braille character simultaneously in connection with the instructions, for the student's information and finger reading practice, comprises a tape recorder 20 having two input heads 22 and 24 laterally spaced relatively to the tape 26 for simultaneously producing two signal recording tracks 28 and 30, respectively. The recorder receives two input signals for recording on these two tracks respectively. One of these input signals comes from the voice of the instructor talking into the microphone 32 and transmitted through the voice amplifier 34 to produce a sound track along one side of the tape 26. The other input signal is a combination of one to six frequency signals generated by correspondingly tuned oscillators 36 in response to operation of the corresponding keys 38 representing the six bump positions in a braille character pattern. These frequency signals are transmitted through an amplifier 40 to the other input head in the recorder, for producing the frequency signal track.

The same recorder may be used for playing back the tape recording by using the input signal heads as output heads, and connecting the output signals from the sound track to a speaker or head phones 42 through a suitable voice amplifier 44, and those from the frequency signal track to the tuned solenoids 46 in the receiving fingerboard 48 through a signal amplifier 50.

A visual monitor 52, having six lights 54 connected to operate in response to operation of the corresponding solenoids 46, may be used to indicate visually the operation of the fingerboard.

As shown in FIGURES 7 and 8, the fingerboard 48 has six solenoids 46 for actuating arms 56 to raise the corresponding plungers 58 so that their upward ends form the bumps above the surface of the fingerboard making up the braille character in accordance with the recorded frequency signals which are being transmitted to the solenoids. A screw 60 serves as a stop for each arm 56, a spring 62 being provided for each arm 56 to normally bias the arm against the screw. Screw 60 is backed in adjusted position by nut 64, to hold the upper end of the corresponding plunger 58 below the surface of the fingerboard. When a solenoid is energized, the upper end of the corresponding plunger 58 is raised to produce a braille bump on the corresponding position of the braille pattern.

The visual monitor has six signal lights 54 mounted in the top of a box 66. These lights are connected with the fingerboard for operation in response to the actuation of the corresponding arms 56 in the fingerboard. The visual monitor may be used by the instructor to check on the proper operation of the solenoids 46.

The keyboard 68 has the six keys 38 normally biased by springs 70 upwardly into inactive positions. When a key is depressed, the corresponding switch arm 72 latches over the base flange 74 of the key to hold it down, while closing the circuit for operating the correspondingly tuned oscillator 36 through its switch 78. A release bar 76 is used for reopening all the switches 78 while moving the arms 72 off the base flanges to release all keys to their inactive positions.

Instead of one keyboard, any number of keyboards 80, lined up in a row, made be used as shown in FIGURE 10. Each key 82 on any of the keyboards is connected to an oscillator in casing 84 tuned to a different frequency, whereby a record is obtained on a double track tape 26 through a pair of suitable signal amplifiers 86 and heads 22 and 24. When this double track tape recording is played back, the fingerboards 90 on panel 88 are operated to spell one or more words in braille in accordance with keyboard operation recorded on said tape, one track 28 controlling a portion of the bumps 92 on the fingerboard panel 88 through amplifier 94, the other track 30 controlling the rest of the bumps 92 through the playback heads 22 and 24.

The letter spacing on the fingerboard panel 88 is made actual size, so that the word or other arrangement of characters may be contacted with the fingers and read just as in any other braille reading. The panel 88 may form the top of a unitary casing and the cable from amplifier 94 could be passed into the casing before branching into the individual fingerboards 90. The same is true in the case of the several keyboards used. These keyboards 80 could be mounted in a unitary container and their individual wiring connections to the cable from the oscillator casing 84 could be made internally of this container.

The release bars 76 of all the keyboards may be interconnected for simultaneous release of two or more bars, if desired. For every keyboard 80 used, there are six differently tuned oscillators in casing 84, and one fingerboard correspondingly spaced on the fingerboard panel 88.

Many other obvious modifications in the arrangement and construction of the parts may be made without departing from the spirit and scope of the present invention as defined in the appended claims.

What is claimed is:
1. In a braille recording and reproducing system,
   a keyboard having six keys arranged in two adjacent vertical rows of three keys in each row corresponding to the six bump positions in a braille character,
   said keys having base flanges and being normally biased upwardly into an inactive position with their base flanges biased upwardly against a surface under said keyboard,
   a switch arm pivoted adjacent each key to swing along said surface and extending inwardly from the outside of either of said rows into the space between them,
   each switch arm in an open switch position being resiliently biased in the same direction against the peripheral edge of the base flange of its key, so that upon depressing a key, its switch arm latches over the base flange into a closed switch position and holds the key down, and
   a release bar slidably mounted between said rows and having shoulders on it for engaging the inner ends of said switch arms for moving said arms off the base flanges of the depressed keys to return all the switch arms to open switch positions and release all the keys into their inactive positions.
2. A keyboard as defined in claim 1,
   oscillating means for producing electrical signals of different frequencies by closing the six different switches actuated by depression of said respective keys,
   magnetic tape means having at least one track for recording said signals representing any braille character that may be registered on said keyboards, and
   a fingerboard operated in response to the playing back of said recording to produce the bumps of said braille character.
3. A keyboard and fingerboard system as defined in claim 2,
   at least one additional keyboard forming a panel with said first keyboard for registering a plurality of braille characters for recording simultaneously on said one track, and
   at least one additional fingerboard forming a reading panel with said first fingerboard for reproducing said plurality of braille characters in the same order.
4. A keyboard and fingerboard system as defined in claim 3,
   a second similar panel of keyboards mounted in extension of said first keyboard panel for registering additional braille characters to accommodate a longer series of characters for simultaneous recordation on a second track on said magnetic tape, and
   a corresponding second panel of fingerboards mounted in extension of the first panel for reproducing said second series of braille characters.

References Cited by the Examiner

UNITED STATES PATENTS

| | | | |
|---|---|---|---|
| 1,790,985 | 2/1931 | Grondahl | 35—35.1 |
| 2,812,138 | 11/1957 | Malavazos | 235—145 |
| 2,866,279 | 12/1958 | Surber | 35—35.1 |
| 3,230,644 | 1/1966 | Irazoqui | 35—35.1 |

EUGENE R. CAPOZIO, *Primary Examiner.*

W. GRIEB, *Assistant Examiner.*

Dedication 3,289,327.—*Manuel Chevillon*, Montgomery County, Md. BRAILLE RECORDING AND REPRODUCING MEANS. Patent dated Dec. 6, 1966. Dedication filed Sept. 8, 1970, by the inventor.
Hereby dedicates the entire patent to the Public.
[*Official Gazette January 26, 1971*]